United States Patent
Gu et al.

(10) Patent No.: US 7,368,096 B2
(45) Date of Patent: May 6, 2008

(54) PROCESS FOR SEPARATING SOLIDS FROM A PURIFICATION PURGE STREAM

(75) Inventors: Xuqing Gu, Newark, DE (US); Stephen Erwin Lyke, Wilmington, DE (US); Steve Mirabella, New Johnsonville, TN (US); Joseph M. Shekiro, Jr., Newark, DE (US); Jodi Lynn Witt, New Castle, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 323 days.

(21) Appl. No.: 11/146,688

(22) Filed: Jun. 7, 2005

(65) Prior Publication Data

US 2006/0275195 A1    Dec. 7, 2006

(51) Int. Cl.
C01G 23/02 (2006.01)

(52) U.S. Cl. .................. 423/492; 423/76; 423/77; 423/79

(58) Field of Classification Search .................. 423/72, 423/75, 76, 77, 492, 69, 79
See application file for complete search history.

(56) References Cited

U.S. PATENT DOCUMENTS

| | | | |
|---|---|---|---|
| 3,009,541 A | 11/1961 | Mas et al. | |
| 3,520,650 A | 7/1970 | Cole et al. | |
| 3,628,913 A * | 12/1971 | Uhland | 423/77 |
| 3,696,519 A | 10/1972 | Pefferman | |
| 3,742,612 A | 7/1973 | Pefferman | |
| 3,744,978 A | 7/1973 | Pefferman | |
| 3,867,515 A | 2/1975 | Bohl et al. | |
| 3,906,077 A * | 9/1975 | Rado et al. | 423/149 |
| 3,939,244 A * | 2/1976 | Piccolo et al. | 423/76 |
| 4,100,252 A | 7/1978 | Pitts | |
| 4,578,090 A * | 3/1986 | Rado | 95/188 |
| 5,494,648 A | 2/1996 | Olsen et al. | |
| 6,969,500 B2 * | 11/2005 | Bonath et al. | 423/240 R |

* cited by examiner

*Primary Examiner*—Ngoc-Yen Nguyen

(57) ABSTRACT

The disclosure is directed to a process for isolating solids from a purification purge stream comprising an impurity present as a solid, wherein the purification purge stream is substantially free of chlorides other than titanium tetrachloride and vanadium chloride, the process comprising the steps of: (a) atomizing the purification purge stream comprising titanium tetrachloride as a liquid and an impurity present as a solid; (b) drying solids in the atomized purification purge stream by contacting the atomized stream with a titanium tetrachloride vapor stream such that the combined streams reach a temperature of at least about 140° C. to vaporize the liquid titanium tetrachloride, wherein the titanium tetrachloride vapor is substantially free of chlorides other than those of titanium and vanadium, and substantially free of non-condensable gases comprising CO, $CO_2$, $N_2$, or mixtures thereof; and (c) separating the impurity present as a solid from the vaporized titanium tetrachloride. The separated vanadium solids may be further processed to recover valuable by products.

21 Claims, 1 Drawing Sheet

PROCESS FOR SEPARATING SOLIDS FROM A PURIFICATION PURGE STREAM

BACKGROUND OF THE DISCLOSURE

1. Field of the Disclosure

The disclosure relates to a process for separating solids from a purification purge stream, and more particularly to a process for removing impurities comprising vanadium and/or hydrocarbon residues from a purification purge stream comprising titanium tetrachloride and the impurity.

2. Description of the Related Art

Titanium tetrachloride obtained by reacting titanium-containing ore with chlorine can contain impurities comprising chlorides of iron, silicon, tin, aluminum, vanadium, chromium, niobium (columbium), tantalum, tungsten, tin, zirconium, etc., resulting from the corresponding metals present as impurities in the ore. Of these impurities the most significant is vanadium, because there is only approximately a 9° C. difference between the boiling point of its chloride and that of titanium tetrachloride causing it to vaporize at approximately the same temperature as titanium tetrachloride making it difficult to separate. Vanadium is a valuable material, but it is difficult to recover economically.

After preliminary separation from higher boiling impurities, crude titanium tetrachloride is subjected to chemical purification to remove vanadium. In this chemical purification step, a reagent is added that removes dissolved vanadium into a solid phase, generally together with a residue of the reagent. Separating purified titanium tetrachloride leaves behind a slurry containing the solids, which must be purged from the purification step. Currently, purge titanium tetrachloride from purification comprising vanadium solids is recycled back to the preliminary separation step, which mixes those solids with the higher boiling impurities, and may result in the re-chlorination of the vanadium solids formed in the purification step as well as the formation of Persistent, Bio-accumulative, and Toxic (PBT) organic compounds from hydrocarbon residues.

A need exists for a robust process for the separation of vanadium chloride from the titanium tetrachloride formed in the chlorination process, and for removal of any hydrocarbon residues that may be formed during the purification step.

SUMMARY OF THE DISCLOSURE

In a first aspect, the disclosure provides a process for isolating solids from a purification purge stream, wherein the purification purge stream is substantially free of chlorides other than titanium tetrachloride and vanadium chloride, the process comprising the steps of:
  (a) atomizing the purification purge stream comprising liquid titanium tetrachloride and an impurity present as a solid;
  (b) drying solids in the atomized purification purge stream by contacting the atomized stream with a titanium tetrachloride vapor stream such that the combined streams reach a temperature of at least about 140° C., more typically at least about 200° C., and most typically at least about 210° C., to vaporize the liquid titanium tetrachloride, wherein the titanium tetrachloride vapor is substantially free of chlorides other than those of titanium and vanadium, and substantially free of non-condensable gases comprising CO, $CO_2$, $N_2$, or mixtures thereof; and
  (c) separating the impurity present as a solid from the vaporized titanium tetrachloride.

In the first aspect, the process further comprises a step wherein the vaporized titanium tetrachloride from step (c) is scrubbed with liquid titanium tetrachloride, whereby residual solids in the vaporized titanium tetrachloride are substantially removed as a slurry which may be recycled back to the atomization step. The vaporized titanium tetrachloride may then be condensed to form liquid titanium tetrachloride substantially free of solids. Moreover, the above-mentioned scrubbing process may include a vapor phase vanadium clean-up feature by adding a purification agent (defined below) to the scrubbing liquid. The advantage of incorporating the vanadium treatment in the scrubbing process is that the resulting titanium tetrachloride will be substantially free of vanadium and therefore can be used directly as a purified titanium tetrachloride without recycle and reprocessing in the purification area.

In the second aspect, the purification purge stream is obtained by treating titanium tetrachloride-containing feedstock comprising an impurity with a purification agent capable of trapping the impurity in a solid phase. The purification agent may be selected from the group including, but not limited to, fatty acids, more typically tallow type fatty acids such as T22 obtained from Proctor and Gamble Chemicals, Cincinatti, Ohio and suitable hydrotreated petroleum fractions such as Ergon Hyprene H750 or L1200 napthenic oils obtained from Ergon Refining, Inc., Vicksburg, Miss. The impurity may comprise vanadium or hydrocarbon residues.

In the third aspect, the separated solid impurity is further processed to recover valuable byproducts. For example, vanadium pentoxide may be recovered from the solids by application of well-known techniques used to produce that oxide from impure ores and from recycled spent catalysts.

BRIEF DESCRIPTION OF THE DRAWING

Specific embodiments of the disclosure are described below with reference to the following drawing.

DETAILED DESCRIPTION OF THE DISCLOSURE

Figure 1:
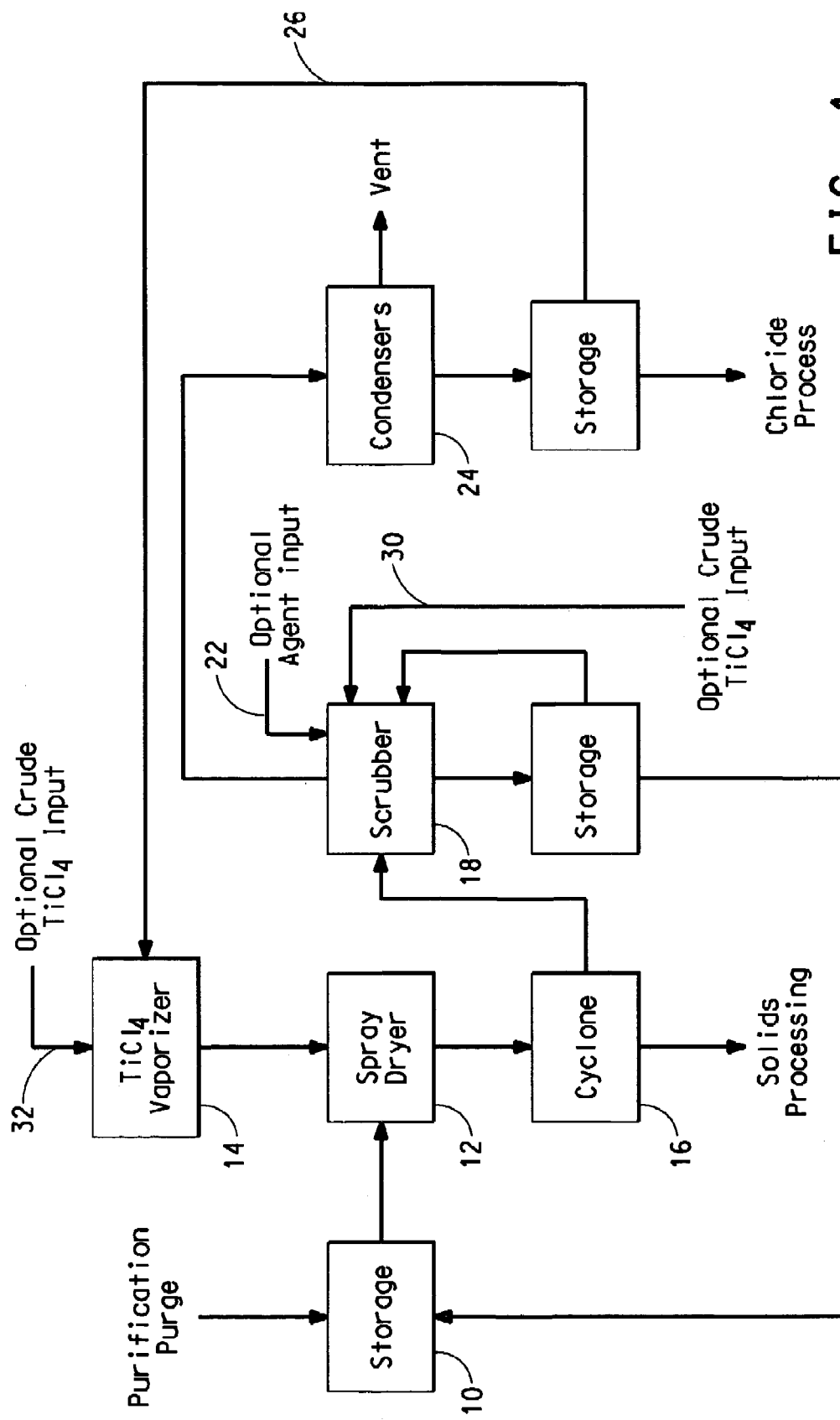
FIG. 1 is a simplified schematic block diagram of a process of the disclosure.

The titanium tetrachloride-containing feedstock that is purified to form the purification purge stream is commonly produced by chlorinating a titaniferrous ore, such as ilmenite, rutile, arizonite, leucoxene and titanium slags and concentrates, in the presence of carbon or carbonaceous material, e.g. coke, at temperatures from 500° C. to about 1,400° C. The chlorination is typically conducted in a static bed or a fluidized bed reactor. Ore and chlorine are introduced into a chlorinator and titanium and other metals are chlorinated to their respective chlorides. In addition to titanium tetrachloride, typical metal chloride components in the product effluent include chlorides of iron, silicon, tin, aluminum, vanadium, chromium, niobium (columbium), tantalum, tungsten, tin, zirconium, etc. Most of the chlorides formed during the chlorination process are removed by partial condensation, leaving titanium tetrachloride comprising vanadium chloride as the primary impurity.

In the process of this disclosure, a purification purge stream may be obtained by treating titanium tetrachloride-containing feedstock comprising vanadium with a treating agent capable of trapping the impurity in a solid phase. The purification agent may be selected from the group of fatty acids such as tallow type fatty acids, e.g. T22 obtained from Proctor and Gamble Chemicals, Cincinatti, Ohio, and suitable hydrotreated petroleum fractions such as Ergon Hyprene H750 or L1200 napthenic oils obtained from Ergon Refining, Inc., Vicksburg, Miss., etc. The treatment results in the vanadium being present primarily as a solid and the titanium tetrachloride being present as a liquid. Purified titanium tetrachloride may then be recovered by evaporation, leaving behind a slurry containing the solid, which must be purged from the purification step. Other trace impurities may also be present in the purification purge stream as well as residual material from the treating agent. Impurities that can be removed by the process of this disclosure include vanadium and vanadium-containing compounds such as vanadium oxytrichloride. During the purification step, hydrocarbon residues, which can include PBT compounds or their precursors, may be formed. Some examples of PBT compounds include chlorinated benzenes, biphenyls, dibenzofurans and dibenzodioxins. Examples of precursors could include a wide variety of carbonaceous compounds that can result from degradation of the purification agent. These compounds can act as PBT precursors when exposed to the chlorine concentrations and temperature ranges they typically encounter during customary recycle to the preliminary separation step.

The purification purge stream comprising an impurity, such as vanadium or hydrocarbon residues present as a solid, and titanium tetrachloride present as a liquid is then subjected to an atomizing step. Referring to FIG. 1 this can be accomplished using a nozzle atomizer or a rotary disc atomizer present in a spray dryer 12. Suitable nozzle atomizers may be obtained from Spraying Systems Co. (Wheaton, Ill.), and some suitable spray dryers comprising nozzle or rotary disc atomizers may be obtained from GEA Niro, Inc. (Columbia, Md.).

The next step in the process includes drying the impurity that is present in the atomized purification purge stream comprising the atomized titanium tetrachloride and the impurity that is present as a solid by contact, typically immediate contact, with a heated stream of titanium tetrachloride vapor from titanium tetrachloride vaporizer 14. Depending upon the quantity and temperature of the vapor stream, the combined streams may reach a temperature of at least about 140° C., more typically at least about 190° C., and most typically at least about 210° C. This results in the drying of the impurity and vaporization of the atomized liquid titanium tetrachloride. The titanium tetrachloride vapor is substantially free of chlorides other than those of titanium and vanadium, and substantially free of non-condensable gases comprising CO, $CO_2$, $N_2$, or mixtures thereof. Drying may be accomplished in a spray dryer, a fluid-bed spray dryer or a flash dryer. Alternately, both the atomizing and drying steps may be accomplished in the spray dryer 12. The titanium tetrachloride vapor used in this step of the process may be obtained by re-circulating and heating a portion of the substantially solids-free titanium tetrachloride from the scrubbing step. Optionally a crude titanium tetrachloride stream can be introduced to vaporizer 14 via line 32.

The vaporized titanium tetrachloride containing impurities may then be subjected to a separation step (c) wherein the impurity comprising vanadium and/or hydrocarbon residue, present as a solid, is separated from the vaporized titanium tetrachloride. Cyclone separator 16 is shown in FIG. 1. This may be accomplished within the spray dryer, in a downstream cyclone (typically designed and supplied together with the spray dryer), or partially in the spray dryer and partially in the cyclone. Vanadium solids collected in the spray dryer and/or in the cyclone may be removed as dry solids, which may have a tendency to fume or oxidize upon contact with air, or, typically, the solids may be quenched in water. The dry or quenched solids may be neutralized for disposal by conventional means. Alternatively, the solids may be further processed to recover valuable byproducts. For example, vanadium pentoxide may be recovered from the solids by application of well-known techniques to produce that oxide from impure ores and from recycled spent catalysts.

The vaporized titanium tetrachloride from step (c) may be scrubbed in scrubber 18 with liquid titanium tetrachloride, whereby any residual solids in the vaporized titanium tetrachloride are substantially removed as a slurry that may be recycled to the atomization step via line 20. The liquid titanium tetrachloride used may be at a temperature close to the condensation point of the vapor stream, which, at typical operating pressures, would fall between 120 and 150° C. Some suitable scrubbers may include spray towers, venturi scrubbers, packed column scrubbers, plate column scrubbers, and combinations thereof. A typical combination may include a spray tower along with a plate column scrubber. Such scrubbing equipment is widely available from chemical processing equipment suppliers. The vapor stream entering the scrubber may still contain some vanadium as a gaseous compound. In that case, the scrubbing process may include a vapor phase vanadium clean-up feature by adding a purification agent to the scrubbing liquid which can be introduced via line 22. Purification agent treatment allows the scrubbed vapor to be substantially free of vanadium so that it can be used directly as purified titanium tetrachloride without recycle and reprocessing in the purification area.

A portion of the vaporized and scrubbed titanium tetrachloride may be re-circulated and reheated for use in the drying step. In a subsequent step, the residual vaporized titanium tetrachloride is condensed in condenser 24 to form substantially solids-free liquid titanium tetrachloride. This may be accomplished by conventional means. A portion of the solids-free liquid titanium tetrachloride may be re-circulated, as shown in recirculation line 26 of FIG. 1, and vaporized for use in the drying step. That portion may be advantageously pre-heated before vaporization, by heat exchange with the vaporized and scrubbed titanium tetrachloride stream, effecting partial condensation of that stream. Another portion of the solids-free liquid titanium tetrachloride may be used in the scrubbing step, and the remainder may be returned to the purification step. Alternatively, this remaining portion can pass directly to the purified titanium tetrachloride stream if its vanadium content is not higher than desired. Vanadium content of this solid-free liquid titanium tetrachloride can be further reduced when the purification purge stream contains un-reacted treating agent or when residual vanadium in the vaporized stream is substantially removed by applying a purification agent to the scrubbing liquid.

Alternate embodiments of this invention may be implemented when, under conditions described above, the titanium tetrachloride separated from the purification purge stream has a vanadium content as low as desired for purified titanium tetrachloride. The solids-free titanium tetrachloride vapor (after scrubbing) may be condensed together with additional pure titanium tetrachloride vapor in, for example, a condenser similar to or the same as that used to condense the titanium tetrachloride after the scrubbing step described earlier. In a second embodiment, wherein the titanium tetrachloride has a low vanadium content, or is free of vanadium, all or part of the scrubbing step, wherein the titanium tetrachloride vapor is contacted with liquid titanium tetrachloride, whereby the solids are substantially removed, may also be accomplished together with additional vanadium-free, but solids-containing, titanium tetrachloride vapor. An optional crude titanium tetrachloride stream 30 can be introduced to the scrubber, said crude titanium tetrachloride stream may contain solids and, additionally, may be vanadium-free. Optionally, a purification agent treatment may be added to treat the crude titanium tetrachloride stream allowing the scrubbed vapor to be substantially free of vanadium and other solids. The combined vapors may then be condensed together, as described for the first alternate embodiment. These embodiments would combine one or more similar steps between the process described earlier for isolating solids from a purification purge stream and the purification process itself.

In another embodiment, a process for isolating solids from a purification purge stream is described comprising the steps of:

(a) vaporizing at least a portion of the titanium tetrachloride feedstock and an optional crude titanium tetrachloride stream, shown as line 32 of FIG. 1, and heating the vapor;

(b) atomizing a purge stream comprising liquid titanium tetrachloride and an impurity present as a solid;

(c) drying solids in the atomized purge stream by contacting the atomized stream with the heated titanium tetrachloride vapor stream from (a) such that the combined streams reach a temperature of at least about 140° C. to vaporize the liquid titanium tetrachloride, wherein the resulting titanium tetrachloride vapor is substantially free of chlorides other than those of titanium and vanadium, and substantially free of non-condensable gases comprising CO, $CO_2$, $N_2$, or mixtures thereof;

(d) separating the impurity present as a solid from the vaporized titanium tetrachloride; and (e) contacting the vaporized titanium tetrachloride stream with liquid titanium tetrachloride to which a purification agent has been added, producing a vapor product, additionally a purified vapor product, and a liquid purge stream that is recycled to the atomizing step (b). This contacting step may be accomplished in a scrubber or other suitable contacting device. The step captures residual solids and gaseous vanadium compounds from the vaporized titanium tetrachloride into the purge stream. In this embodiment, the vapor product can be condensed and used directly as purified titanium tetrachloride, and the need for a separate purification device and step is eliminated. The vaporized feedstock of (a) may be heated by any conventional means which are well-known in the art.

The titanium tetrachloride product of the process described herein can be used in any application for which titanium tetrachloride is useful. The titanium tetrachloride can be used as a starting material for making titanium dioxide and derivatives thereof especially as part of the well-known chlorination and oxidation processes for making titanium dioxide. Purified titanium tetrachloride may also be used as a feedstock for producing titanium metal, such as by the Kroll process, or for producing catalysts and specialty chemicals. Titanium dioxide is useful in compounding; extrusion of sheets, films and shapes; pultrusion; coextrusion; ram extrusion; spinning; blown film; injection molding; insert molding; isostatic molding; compression molding; rotomolding; thermoforming; sputter coating; lamination; wire coating; calendaring; welding; powder coating; sintering; cosmetics; paint; paper; and catalysts.

Titanium dioxide can be suitable as a pigment. Alternatively, titanium dioxide can be in the nano-size range (average particle diameter less than 100 nm), which is usually translucent or transparent.

Applicants specifically incorporate the entire content of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range.

The description of illustrative and preferred embodiments of the present disclosure is not intended to limit the scope of the disclosure. Various modifications, alternative constructions and equivalents may be employed without departing from the true spirit and scope of the appended claims.

In one embodiment, the invention herein can be construed as excluding any element or process step that does not materially affect the basic and novel characteristics of the composition or process. Additionally, the invention can be construed as excluding any element or process step not specified herein.

What is claimed is:

1. A process for isolating solids from a purification purge stream, wherein the purification purge stream is substantially free of chlorides other than titanium tetrachloride and vanadium chloride, the process comprising the steps of:

(a) atomizing the purification purge stream comprising liquid titanium tetrachloride and impurities present as solids;

(b) drying solids in the atomized purification purge stream by contacting the atomized stream with a titanium tetrachloride vapor stream such that the combined streams reaches a temperature of at least about 140° C. to vaporize the liquid titanium tetrachloride in the purification purge stream, wherein the resulting titanium tetrachioride vapor is substantially free of chlorides other than those of titanium and vanadium, and substantially free of non-condensable gases comprising CO, $CO_2$, $N_2$, or mixtures thereof; and (c) separating the impurity impurities present as solids from the resulting titanium tetrachloride vapor obtained in step (b).

2. The process of claim 1 further comprising scrubbing the titanium tetrachloride vapor from step (c) with liquid a titanium tetrachioride scrubbing liquid, whereby residual solids in the titanium tetrachloride vapor obtained in step (c) are substantially removed.

3. The process of claim 2 wherein the titanium tetrachloride vapor obtained in step (c) comprises a gaseous vanadium component.

4. The process of claim 3 further comprising treating the titanium tetrachloride vapor obtained in step (c) comprising the gaseous vanadium component by applying a purification agent to the scrubbing liquid whereby the gaseous vanadium component is removed.

5. The process of claim 1 further comprising condensing the titanium tetrachloride vapor obtained in step (c) to form liquid titanium tetrachloride that is substantially free of solids.

6. The process of claim 1 further comprising forming the purification purge stream by treating a titanium tetrachloride-containing feedstock comprising impurities with a purification agent capable of trapping the impurities in a solid phase.

7. The process of claim 2 further comprising combining the titanium tetrachloride vapor after the scrubbing step that is substantially free of solids with additional pure titanium tetrachloride vapor to form a mixed stream, and condensing the mixed stream to form purified liquid titanium tetrachloride.

8. The process of claim 2 further comprising combining the titanium tetrachloride vapor obtained from step (c) that comprises residual solids with additional solids-containing titanium tetrachloride vapor to form a mixed stream before scrubbing with the titanium tetrachloride scrubbing liquid, whereby substantially all the solids is removed from the mixed streams and the scrubbed mixed stream can be condensed together to form purified liquid titanium tetrachloride.

9. The process of claim 1 wherein the impurities comprises vanadium.

10. The process of claim 1 wherein the impurities comprises PBT precursors.

11. The process of claim 1 wherein the combined stream has a temperature of at least about 190° C.

12. The process of claim 1 wherein the combined stream has a temperature of at least about 210° C.

13. The process of claim 5 further comprising recirculating the liquid titanium tetrachloride that is substantially free of solids and vaporizing the recirculated liquid for use in step (b).

14. The process of claim 6 wherein the titanium tetrachloride-containing feedstock is derived from a reaction of titanium dioxide ore and chlorine to form a gaseous product that is liquefied and that is substantially free of non-titanium and non-vanadium metal chlorides.

15. The process of claim 2 in which the titanium tetrachloride scrubbing liquid is a crude titanium tetrachloride stream.

16. A -process for isolating solids from a purification purge stream comprising liquid titanium tetrachloride and impurities present as solids, comprises the steps of:
  (a) vaporizing at least a portion of a titanium tetrachloride feedstock and heating the resulting titanium tetrachloride vapor stream;
  (b) atomizing the purification purge stream;
  (c) drying solids in the atomized purification purge stream by contacting the atomized stream with the heated titanium tetrachioride vapor stream from (a) such that the combined streams reaches a temperature of at least about 140° C. to vaporize the liquid titanium tetrachloride in the purification purge stream, wherein the resulting titanium tetrachloride vapor is substantially free of chlorides other than those of titanium and vanadium, and substantially free of non-condensable gases comprising $CO$, $CO_2$, $N_2$, or mixtures thereof;
  (d) separating the impurities present as solids from the resulting titanium tetrachloride vapor obtained in step (c); and
  (e) contacting the titanium tetrachloride vapor obtained from step (d) with a titanium tetrachloride scrubbing liquid to which a purification agent has been added to produce a vapor product and a liquid purge stream that is recycled to the atomizing step (b).

17. The process of claim 16 wherein the purification agent is selected from the group consisting of fatty acids and hydrotreated petroleum fractions.

18. The process of claim 2 further comprising separating the scrubbed titanium tetrachloride vapor into a first portion and a second portion and condensing the first portion of the scrubbed titanium tetrachloride vapor to form liquid titanium tetrachioride that is substantially free of solids.

19. The process of claim 18 further comprising vaporizing the liquid titanium tetrachloride that is substantially free of solids and recirculating the resulting vaporized titanium tetrachloride to step (b) as part of the titanium tetrachloride vapor stream.

20. The process of claim 19 further comprising preheating the liquid titanium tetrachloride that is substantially free of solids before the steps of vaporizing and recirculating by heat exchange with the second portion of the scrubbed titanium tetrachloride vapor.

21. The process of claim 1 further comprising processing the separated impurities to recover valuable byproducts.

* * * * *